(12) United States Patent
Kim et al.

(10) Patent No.: US 11,949,110 B2
(45) Date of Patent: Apr. 2, 2024

(54) ELECTROLYTIC COPPER FOIL, METHOD FOR MANUFACTURING THE SAME, AND ANODE FOR LITHIUM SECONDARY BATTERY OF HIGH CAPACITY

(71) Applicant: KCF Technologies Co., Ltd., Anyang-si (KR)

(72) Inventors: Seung Min Kim, Anyang-si (KR); An Na Lee, Anyang-si (KR)

(73) Assignee: SK NEXILIS CO., LTD., Jeongeup-si (KR)

( * ) Notice: Subject to any disclaimer, the term of this patent is extended or adjusted under 35 U.S.C. 154(b) by 513 days.

(21) Appl. No.: 16/643,773

(22) PCT Filed: Aug. 27, 2018

(86) PCT No.: PCT/KR2018/009862
§ 371 (c)(1),
(2) Date: Mar. 2, 2020

(87) PCT Pub. No.: WO2019/045387
PCT Pub. Date: Mar. 7, 2019

(65) Prior Publication Data
US 2021/0167397 A1   Jun. 3, 2021

(30) Foreign Application Priority Data

Aug. 30, 2017  (KR) .................. 10-2017-0110100

(51) Int. Cl.
*H01M 4/66* (2006.01)
*C25D 1/04* (2006.01)
(Continued)

(52) U.S. Cl.
CPC ............. *H01M 4/661* (2013.01); *C25D 1/04* (2013.01); *C25D 3/38* (2013.01); *C25D 5/48* (2013.01);
(Continued)

(58) Field of Classification Search
CPC .............. H01M 4/661; H01M 4/0438; H01M 10/0525; C25D 1/04; C25D 3/38; C25D 5/48

See application file for complete search history.

(56) References Cited

U.S. PATENT DOCUMENTS

| | | | |
|---|---|---|---|
| 2013/0115510 A1* | 5/2013 | Tani ..................... | H01M 4/134 205/205 |
| 2013/0306486 A1 | 11/2013 | Maeda et al. | |
| 2016/0344006 A1* | 11/2016 | Ota ........................ | H01M 4/13 |

FOREIGN PATENT DOCUMENTS

| | | |
|---|---|---|
| CN | 1224327 A | 7/1999 |
| CN | 102933746 A | 2/2013 |

(Continued)

OTHER PUBLICATIONS 16643773 (Year: 2022).*

(Continued)

*Primary Examiner* — Brian R Ohara
*Assistant Examiner* — Emily Elizabeth Freeman
(74) *Attorney, Agent, or Firm* — K&L Gates LLP

(57) ABSTRACT

The present invention relates to a copper foil current collector having superior adhesion to an active material of a Li secondary battery. The electrolytic copper foil of the present invention having a first surface and a second surface comprises: a first protective layer at the first surface; a second protective layer at the second surface; and a copper film between the first and second protective layers, wherein an oxygen-containing part at the second surface has a thickness (OT) of not less than 1.5 nm. According to the present invention, an electrolytic copper foil current collector for a Li secondary battery, which has low electric resistance and high adhesion to an active material, can be provided.

13 Claims, 3 Drawing Sheets

(51) Int. Cl.
*C25D 3/38* (2006.01)
*C25D 5/48* (2006.01)
*H01M 4/04* (2006.01)
*H01M 10/0525* (2010.01)

(52) U.S. Cl.
CPC ..... *H01M 4/0438* (2013.01); *H01M 10/0525* (2013.01)

(56) References Cited

FOREIGN PATENT DOCUMENTS

| | | | |
|---|---|---|---|
| CN | 106558703 A | | 4/2017 |
| JP | H07268678 A | | 10/1995 |
| JP | H11106949 A | | 4/1999 |
| JP | H11273683 A | | 10/1999 |
| JP | 2000160357 A | | 6/2000 |
| JP | 2001189154 A | | 7/2001 |
| JP | 2013211229 A | | 10/2013 |
| JP | 2016191086 A | * | 11/2016 |
| JP | 2016191135 A | | 11/2016 |
| JP | 2016191135 A | * | 11/2016 |
| JP | 2016194112 A | | 11/2016 |
| KR | 20110042072 A | | 4/2011 |
| KR | 20160007047 A | | 1/2016 |
| KR | 20170000761 A | | 1/2017 |

OTHER PUBLICATIONS

Japanese Office Action for related Japanese Application No. 2020-512743; action dated Jun. 8, 2021; (5 pages).
International Search Report for related International Application No. PCT/KR2018/009862 report dated Nov. 28, 2018; (5 pages).
Written Opinion for related International Application No. PCT/KR2018/009862 report dated Nov. 28, 2018; (4 pages).
Extended European Search Report for related European Application No. 18851880.7; action dated Apr. 16, 2021; (10 pages).
Wang, et al.; "Common Knowledge Evidence—Discussion on Determination Dissolved Oxygen in Water by Iodimetry"; Arid Cnuironmentdal Monitoring, Sep. 2006; vol. 20, No. 3; (3 pages).
Chinese Office Action for related Chinese Application No. 201880070096.5; action dated Sep. 7, 2021; (17 pages).

* cited by examiner

ELECTROLYTIC COPPER FOIL, METHOD FOR MANUFACTURING THE SAME, AND ANODE FOR LITHIUM SECONDARY BATTERY OF HIGH CAPACITY

CROSS REFERENCE TO RELATED APPLICATIONS

The present application is a National Stage of International Application No. PCT/KR2018/009862, filed on Aug. 27, 2018, which claims the benefit of Korean Patent Application No. 10-2017-0110100 filed on Aug. 30, 2017 with the Korean Intellectual Property Office, the entire contents of each hereby incorporated by reference.

FIELD OF TECHNOLOGY

The present invention relates to an electrolytic copper foil, and more particularly, to an electrolytic copper foil having superior adhesion to an active material of a Li secondary battery.

BACKGROUND

As the consumer electronics such as a mobile phone, a laptop computer and so on are widely used and hybrid vehicles are popularized, a demand for a Li battery has rapidly increased.

In a lithium secondary battery, an anode current collector is generally made of an electrolytic copper foil. The electrolytic copper foil is manufactured by means of an electroplating process so that a shiny surface of relatively low roughness is formed at one surface of the electrolytic copper foil and a matte surface of relatively high roughness is formed at the other surface. An active material of such as a carbon-based slurry is coated on the matte surface of the electrolytic copper foil.

The adhesion strength between the active material and the electrolytic copper foil used as a current collector depends on the surface status of the electrolytic copper foil, and the yield and capacity of the lithium secondary battery may be determined by the adhesion strength. Particularly, if the adhesion strength between the current collector and the active material is low, the active material may be separated from the current collector during the lifespan of the secondary battery, thereby causing a problem such as an internal short.

It is known that oxygen at a surface of an electrolytic copper foil, which has hydrophilic property, increases the adhesion of the copper foil to the active material. A drawback of the oxygen at the surface layer of the copper foil, however, is that it increases the surface resistance. Hence, a control over the surface layer of the copper foil is required to provide a reliable Li secondary battery.

An aspect of the present invention to achieve the technical demand as described above is to provide an electrolytic copper foil for a Li secondary battery, which has superior adhesion to an active material and low electric resistance.

It is another aspect of the present invention to provide an electrolytic copper foil having a surface oxygen layer profile capable of imparting the high adhesion and low electric resistance to the copper foil.

It is a further aspect of the present invention to provide a method for manufacturing the aforementioned electrolytic copper foil.

It is a still further aspect of the present invention to provide an anode for a Li secondary battery of high discharging capacity retention, which comprises the aforementioned electrolytic copper foil.

SUMMARY

In accordance with the present invention to solve the aforementioned technical problems, there is provided an electrolytic copper foil having a first surface and a second surface opposite to the first surface, the electrolytic copper foil comprising: a first protective layer forming the first surface; a second protective layer forming the second surface; and a copper film between the first and second protective layers, wherein an oxygen-containing part at the second surface has a thickness (OT) of not less than 1.5 nm and less than 8.0 nm, the thickness of the oxygen-containing part at the second surface is a $SiO_2$ conversion thickness of a portion of the second protective layer, and the portion of the second protective layer is a portion showing a concentration of oxygen component of not less than 10 atom % when measured with AES (Auger Electron Spectroscopy) from the second surface.

It is preferable in the present invention that the first protective layer and the second protective layer comprise a chromate.

The concentration of the oxygen component measured from the second surface has a tendency to increase and then decrease as the depth from the second surface becomes deeper.

According to an embodiment of the present invention, the thickness of the oxygen-containing part is preferably less than 8.0 nm.

Further, according to an embodiment of the present invention, it is desirable that, after a heat treatment at 110° C. for 10 minutes, the electrolytic copper foil would have a breaking strength of 25 to 57 $kgf/mm^2$.

Additionally, according to an embodiment of the present invention, a difference between a thickness of an oxygen-containing part at the first surface and the thickness of the oxygen-containing part at the second surface is preferably not more than 5.8 nm.

In accordance with the further aspect of the present invention, there is provided a method for manufacturing an electrolytic copper foil, the method comprising: electroplating a copper film on a rotary cathode drum by applying an electric current between an anode plate and the rotary cathode drum which are disposed apart from each other in an electrolyte contained in an electrolytic bath; winding the copper film; and performing an anticorrosion treatment by immersing the copper film into an anticorrosion treatment solution, wherein an air is injected into the anticorrosion treatment solution when the anticorrosion treatment is performed. The injection of the air may be performed by means of a blower. It is desirable that a dissolved oxygen content of the anticorrosion treatment solution be maintained at 3 to 12 ppm.

It is preferable in the present invention that TIC concentration of the electrolyte be maintained at not more than 0.05 g/L and Fe concentration of the electrolyte be maintained at not more than 0.3 g/L.

In accordance with the still further aspect of the present invention, there is provided an anode for a Li secondary battery, the anode comprising: a current collector including an electrolytic copper foil having a first surface and a second surface opposite to the first surface; and anode active material layers on the first and second surfaces, wherein the electrolytic copper foil comprises: a first protective layer forming the first surface; a second protective layer forming the second surface; and a copper film between the first and second protective layers, wherein an oxygen-containing part at the second surface has a thickness (OT) of not less than 1.5 nm, the thickness of the oxygen-containing part at the second surface is a $SiO_2$ conversion thickness of a portion of the second protective layer, and the portion of the second protective layer is a portion showing a concentration of oxygen component of not less than 10 atom % when measured with AES (Auger Electron Spectroscopy) from the second surface.

According to the present invention, an electrolytic copper foil current collector for a Li secondary battery, which has low electric resistance and high adhesion to an active material, can be provided.

In addition, the present invention can provide an electrolytic copper foil current collector the surface oxygen concentration profile of which is adjusted in such a way that the current collector can have a superior adhesion to an active material.

Furthermore, the present invention can provide an anode of a Li secondary battery of high discharging capacity retention.

DETAILED DESCRIPTION

Hereinafter, preferable embodiments of the present invention will be described with reference to the annexed drawings.

Figure 1:
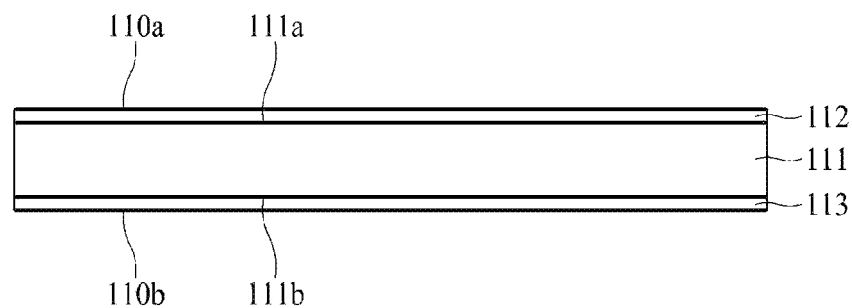
FIG. 1 is a cross sectional view of an electrolytic copper foil according to an embodiment of the present invention.

FIG. 1 is a cross sectional view of an electrolytic copper foil according to an embodiment of the present invention.

Referring to FIG. 1, the electrolytic copper foil 110 has a first surface 110a and a second surface 110b opposite to the first surface 110a, and comprises a first protective layer 112 forming the first surface 110a, a second protective layer 113 forming the second surface 110b, and a copper film 111 between the first and second protective layers 112 and 113.

In the present invention, the electrolytic copper foil 110 has a certain thickness, for example, a thickness of 4 to 30 μm. If the thickness of the copper foil is less than 4 μm, deterioration of workability in a battery-manufacturing process is caused. If the thickness of the copper foil is more than 30 μm, it is difficult to produce a Li secondary battery of high capacity with such a thick copper foil.

The copper film 111 is formed on a rotary cathode drum by an electroplating process, and has a shiny surface (S-surface) 111a, which is a surface contacting the rotary cathode drum during the electroplating process, and a matte surface (M-surface) 111b opposite thereto.

Preferably, the first and second protective layers 112 and 113 comprise anticorrosion coating layers. The anticorrosion coating layer comprise a chromate. The first and second protective layers 112 and 113 prevent the copper film 111 from being oxidized or corroded, and improve the adhesion to an active material.

According to the present invention, the oxygen component profile of the electrolytic copper foil along the thickness direction has the following features. The oxygen-containing part at the second surface 110b of the electrolytic copper foil preferably has a thickness (OT) of not less than 15 nm. Here, the thickness (OT) of the oxygen-containing part at the second surface 110b is a $SiO_2$ conversion thickness of a portion of the second protective layer 113, and the portion of the second protective layer 113 is a portion showing a concentration of oxygen component of not less than 10 atom % when measured with AES (Auger Electron Spectroscopy) from the second surface 110b. In addition, the thickness of the oxygen-containing part at the second surface 110b is preferably less than 8.0 nm. If the thickness of the oxygen-containing part is less than 1.5 nm, the number of the active sites of the oxygen, which contribute to the hydrophilic property of the surface, is too small to provide a sufficient adhesion strength between an anode material and the surface of the copper foil. Thus, when a produced Li secondary battery is evaluated by repetition of charging and discharging, the anode material is easily separated from the copper foil and the charging efficiency of the battery decreases rapidly. If the thickness of the oxygen-containing part is more than 8.0 nm, the resistance at the surface of the copper foil increases and the high resistance causes the charging efficiency of a Li secondary battery to drop.

Further, in the present invention, the difference between the thicknesses (OT) of the oxygen-containing parts at the second surface 110b and first surface 110a is preferably not more than 5.8 nm. Just like the thickness (OT) of the oxygen-containing part at the second surface 110b, the thickness (OT) of the oxygen-containing part at the first surface 110a is a $SiO_2$ conversion thickness of a portion of the first protective layer 112, wherein the portion of the first protective layer 112 is a portion showing a concentration of oxygen component of not less than 10 atom % when measured with AES from the first surface 110a.

If the difference between the thicknesses of the oxygen-containing parts at the first and second surfaces 110a and 110b is more than 5.8 nm, the electrode plate produced by coating anode materials onto both surfaces of the copper foil and drying the same is bent owing to the difference between the adhesion of both surfaces of the copper foil to the anode materials and folded during a roll-to-roll process to produce a Li secondary battery.

In the present invention, it is desirable that, after a heat treatment at 110° C. for 10 minutes, the electrolytic copper foil would have a breaking strength of 25-57 kgf/mm². If the breaking strength is lower than 25 kgf/mm², when a Li secondary battery produced by applying an active material containing Si is evaluated by repetition of charging and discharging, such insufficient strength of the copper foil itself causes a disconnection which, in turn, rapidly decreases the charging efficiency of the battery. If the breaking strength is higher than 57 kgf/mm², the copper foil would have remarkably low stretch property. Thus, when a Li secondary battery is evaluated by repetition of charging and discharging, the copper foil which cannot endure its volume expansion may cause a disconnection of the electrode which, in turn, rapidly decreases the charging efficiency of the battery.

According to the present invention, the weight deviation of the electrolytic copper foil along the width direction thereof is desirably lower than 5%. If the weight deviation is higher than 5%, a wrinkle may occur during the processes for manufacturing the copper foil and Li secondary battery.

In the present invention, the maximum height (Rp) in the surface profile of the second surface is preferably in the range of 0.36-1.69 μm. If the maximum height in the surface profile of the electrolytic copper foil is lower than 0.36 μm, the surface of the copper foil cannot provide sufficient active sites for a uniform coating of the active material, and thus the active material cannot be uniformly coated thereon. Further, if the maximum height is higher than 1.69 μm, the peak height of the copper foil surface is too high to uniformly coat the active material, and thus the same problem as mentioned above occurs. The non-uniform coating of the active material causes local separations of the coated active material at the electrode surface.

Optionally, in the present invention, the first and second protective layers 112 and 113 may further comprise a roughening treatment layer. The roughening treatment layer may be formed by electroplating one of copper, cobalt and nickel or by electroplating an alloy containing not less than two thereof. The roughening treatment layer may be disposed between the anticorrosion coating layer and copper film.

Figure 2:
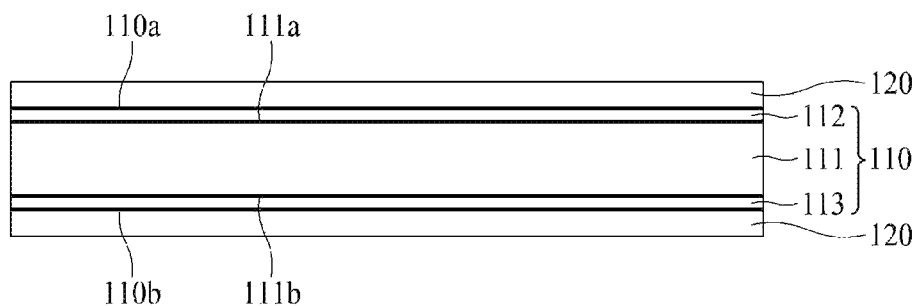
FIG. 2 is a cross sectional view of an anode for a Li secondary battery according to an embodiment of the present invention.

FIG. 2 is a cross sectional view of an anode 100 for a Li secondary battery according to an embodiment of the present invention.

Referring to FIG. 2, as described in connection with FIG. 1, the electrolytic copper foil 110 having a first surface 110a and a second surface 110b comprises a first protective layer 112 forming the first surface 110a, a second protective layer 113 forming the second surface 110b, and a copper film 111 between the first and second protective layers 112 and 113.

Anode active material layers 120 are provided on the first and second protective layers 112 and 113.

The anode active material layer 120 may include a carbon-based compound such as graphite, coke, and so on. Further, the active material of the anode active material layer 120 may comprise at least one metal selected from the group consisting of Si, Ge, Sn, Li, Zn, Mg, Cd, Ce, Ni and Fe; an alloy comprising the metal; or a compound containing the metal. The active material of the anode active material layer 120 may be a composite material of the metal and carbon. The anode active material layer 120 may further include a conductive material and a binder.

Figure 3:
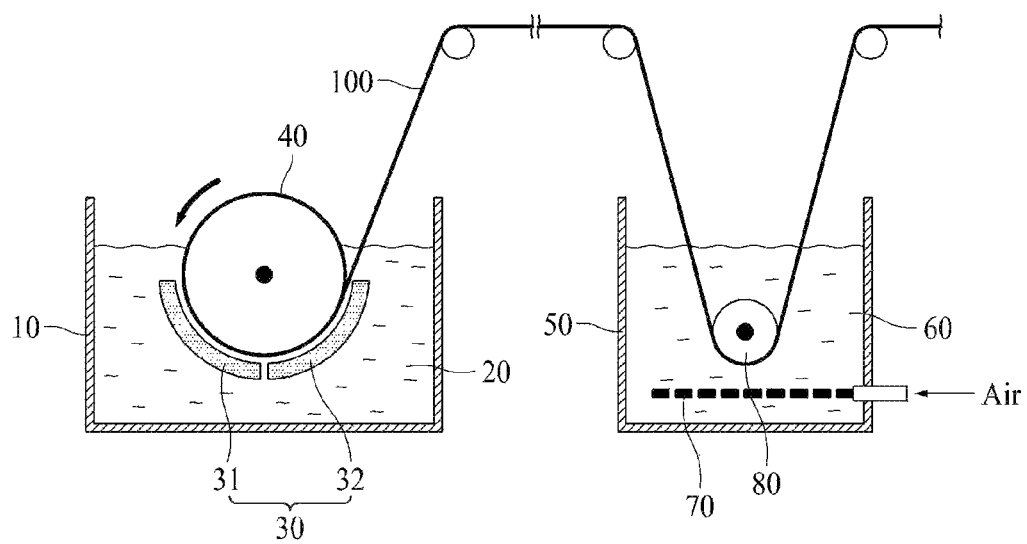
FIG. 3 schematically shows an apparatus for manufacturing an electrolytic copper foil of the present invention.

FIG. 3 schematically shows an apparatus for manufacturing an electrolytic copper foil of the present invention.

The apparatus of FIG. 3 for manufacturing an electrolytic copper foil illustrates a roll-to-roll process comprising a film-forming step and a subsequent step for anticorrosion treatment.

As illustrated in FIG. 3, there are an anode plate 30 and a rotary cathode drum 40 which are disposed apart from each other in an electrolyte 20 contained in an electrolytic bath 10. The rotary cathode drum 40 rotates in a certain direction. When an electric current is applied, the current flows between the cathode drum 40 and anode plate 30 through the electrolyte 20 as a medium, and the electroplating is performed. The copper film 111 electroplated on the surface of the cathode drum 40 is winded by the guide roll 80.

A plating solution of copper sulfate, copper pyrophosphate or copper sulfamate may be used as the electrolyte 20 for the deposition of the copper film 111. In the present invention, a copper sulfate plating solution is preferably used as the electrolyte.

The anode plate 30 may comprise a first anode plate 31 and a second anode plate 32 which are electrically insulated from each other. The current density provided by the anode plate 30, i.e., the current density provided by each of the first and second anode plates 31 and 32, may be 40 to 80 A/dm². The higher the current density is, the more uniform surface is formed by the electroplating so that the mean Rp of the copper foil decreases. If the current density is higher than 80 A/dm², the Rp becomes lower than the required lower limit thereof. On the other hand, if the current density is lower than 40 A/dm², the plating is performed roughly and Rp becomes higher than the upper limit of the range required in the spec.

According to an embodiment of the present invention, the electrolyte 20 may include 70 to 90 g/L of copper ion and 80 to 120 g/L of sulfuric acid.

According to the present invention, the amount of the total inorganic carbon (TIC) in the electrolyte should be maintained not more than 0.05 g/L and the amount of Fe ion therein should be maintained not more than 0.3 g/L. If the TIC concentration is more than 0.05 g/L, the inorganic carbon components accelerate the growth of the plating layer, thereby decreasing the breaking strength thereof. If the Fe concentration is more than 0.3 g/L, Fe component is co-deposited with copper and the alloy thus formed excessively increases the breaking strength.

Further, it is desirable that the electrolyte 20 is maintained at 50 to 60° C. and the flux of the electrolyte 20 introduced into the electrolytic bath 10 is kept at 40 to 46 m³/hour. If the flux of the electrolyte 20 is not more than 40 m³/hour, the copper ions cannot be supplied onto the surface of the rotary cathode drum 40 sufficiently, thereby causing a non-uniformly plated thin film. If the flux of the electrolyte 20 is more than 46 m³/hour, the flow rate of the electrolyte 20 passing through a filter is excessively high, which causes the lifespan of the filter to decrease rapidly.

The copper film produced by the plating is introduced into the anticorrosion treatment bath 50 by the guide roll 80.

According to the present invention, the anticorrosion treatment solution 60 includes a chromate. A mixed aqueous solution made by mixing a dichromate such as $M_2Cr_2O_7$ (wherein, M is a monovalent metal) or a chromic acid such as $CrO_3$ with alkali hydroxide and acid may be used. The anticorrosion treatment solution may further include a zinc salt such as ZnO or $ZnSO_4 \cdot 7H_2O$. If necessary, the anticorrosion treatment solution may further include an organic additive.

According to an embodiment of the present invention, in order to control the thickness of the oxygen-containing part at the surface of the copper foil within an appropriate range, the dissolved oxygen content of the anticorrosion treatment solution is maintained at a certain level. To do this, there is provided a blower 70 in the anticorrosion treatment bath. The flux of the blower 70 is adjusted to control the dissolved oxygen content of the anticorrosion treatment solution 60. As described below regarding an embodiment of the present invention, the dissolved oxygen content is maintained within a range of 3 ppm to 12 ppm.

According to the present invention, the anticorrosion treatment may be performed by simple immersion or electrodeposition, more preferably by electrodeposition.

A surface (e.g., S-surface 111a) of the copper film 111 which comes into contact with the guide roll during the anticorrosion treatment is coated with a relatively small amount of anticorrosion treatment solution 60 compared to the opposite surface (e.g., M-surface 111b) exposed to the anticorrosion solution 60. Consequently, the difference between the electrodeposition amounts on the S-surface 111a and M-surface 111b of the copper film 111 may cause the folding and/or rolling (wrinkle) of the electrolytic copper foil 110. Therefore, according to the present invention, the contact time of the copper film and guide roll may be minimized. For example, it is desirable to use a method such as a horizontal anticorrosion treatment.

Hereinafter, a preferable embodiment of the present invention will be described in detail.

<Manufacture of Electrolytic Copper Foil>

A copper film was formed on a rotary cathode drum by using an apparatus as illustrated in FIG. 3 and allowing an electric current to flow between the rotary cathode drum and anode plate disposed apart from each other in an electrolyte contained in an electrolytic bath.

The electrolyte was made of 75 g/L of copper ion and 100 g/L of sulfuric acid. Copper films were produced under the different conditions with respect to TIC and Fe ion concentrations of the electrolyte. The electrolyte was maintained at about 55° C., the current density was 60 A/dm², and the flux of the electrolyte was 42 m³/hour.

The anticorrosion solution was made as follows. First, $CrO_3$ powder was dispersed in an aqueous solution until the concentration of Cr ion reaches 2.2 g/L. At this time, the pH of the anticorrosion solution was maintained at 1.8-2.2. Citric acid was added thereto in an amount of 0.2-0.4 g/L. The pH of the anticorrosion solution thus obtained was adjusted with sulfuric acid or sodium hydroxide. The resulting copper foils were immersed in the anticorrosion solutions of different dissolved oxygen contents at room temperature (30° C.) for 10 seconds. The anticorrosion solutions of different dissolved oxygen contents were made by injecting different amounts of air to the solution by means of a blower. The dissolved oxygen content in the anticorrosion treatment solution was measured with a dissolved oxygen meter of TOADKK Corp. in Japan.

Subsequently, anticorrosion coating layers were formed on both surfaces of each copper film by drying the coated chromic oxide solution. Electrolytic copper foils having a thickness of 4 μm were produced. The film-making conditions and anticorrosion treatment conditions applied for the copper foils are shown in the following Table 1.

TABLE 1

|  | TIC (g/L) | Fe ion (g/L) | Dissolved oxygen content (ppm) |
|---|---|---|---|
| Ex. 1 | 0.02 | 0.12 | 3.2 |
| Ex. 2 | 0.02 | 0.12 | 11.7 |
| Ex. 3 | 0.04 | 0.12 | 7.5 |
| Ex. 4 | 0.02 | 0.29 | 7.5 |
| Comp. Ex. 1 | 0.02 | 0.12 | 2.7 |
| Comp. Ex. 2 | 0.02 | 0.12 | 12.5 |
| Comp. Ex. 3 | 0.06 | 0.12 | 7.5 |
| Comp. Ex. 4 | 0.02 | 0.34 | 7.5 |

Subsequently, the properties of the resulting electrolytic copper foils were measured. The measuring methods were as follows.

Breaking Strength

A sample of the electrolytic copper foil was grabbed at both ends thereof and then stretched with UTM (Universal Testing Machine). The strength at break was measured. The width of the sample was 12.7 mm, the distance between the grips was 50 mm, and the measuring speed was 50 mm/min.

Thickness (OT) of Oxygen-Containing Part at Second Surface (An Exposed Surface near M-surface)

The depth profile of the oxygen concentration from the second surface (an exposed surface near the M-surface) of the resulting electrolytic copper foil was analyzed under the following conditions by means of PHI 700 model, an AES analysis apparatus provided by ULVAC-PHI Inc.

Electron energy analyzer: CMA (Cylindrical Mirror Analyzer)
Electron beam energy: 5 keV
Target current: 10 nA
Ion energy, Sputtering speed: 2 kV Ar, 60 Å/min ($SiO_2$ conversion)
Ion beam spot size: 2×2 mm²

Thickness of oxygen-containing part: The depth at which the oxygen concentration was measured by AES was obtained from the sputtering etching time in accordance with the following formula ($SiO_2$ conversion method).

$$SiO_2 \text{ conversion depth} = \text{sputtering etching time (min)} \times \text{sputtering speed (60 Å/min)} \quad \text{[Mathematic Formula 1]}$$

The conversion depth of the point at which the measured oxygen concentration was 10 atom % was considered as the thickness (OT) of the oxygen-containing part.

Difference (OTD) between Thicknesses of Oxygen-Containing Parts at First and Second Surfaces OT at the first surface was measured with the same method as described above, and the difference between the OTs at the first and second surfaces was calculated.

Whether Folding Occurs or Not

Whether a folding of the electrolytic copper foil occurs or not during a roll-to-roll process for manufacturing a secondary battery was observed with the naked eyes.

<Manufacture of Anode>

Current collectors of 10 cm width were prepared with the aforementioned electrolytic copper foils produced in the Examples 1-4 and Comparative Examples 1-4. The anode active material to be coated on the current collectors was made by mixing carbon and $SiO_2$ with a weight ratio of 9:1. 100 parts by weight of the anode active material was mixed with 2 parts by weight of SBR (styrene butadiene rubber) and 2 parts by weight of CMC (carboxymethyl cellulose), and a slurry was produced using distilled water as a solvent. The slurry was coated on the current collectors with a thickness of 60 μm by means of a doctor blade, dried at 120° C., and pressed with a pressure of 1 ton/cm² to produce the anodes.

<Manufacture of Li secondary battery>

1 M of $LiPF_6$, a solute, was dissolved in a non-aqueous organic solvent containing a mixture of ethylene carbonate (EC) and ethyl methyl carbonate (EMC) the weight ratio of which is 1:2 to prepare a basic electrolytic solution, and then, 99.5 wt. % of the basic electrolytic solution was mixed with 0.5 wt. % of succinic anhydride to produce the non-aqueous electrolyte.

Lithium manganese oxide ($Li_{1.1}Mn_{1.85}Al_{0.05}O_4$) was mixed with lithium manganese oxide (o-$LiMnO_2$) of orthorhombic crystal structure in a weight ratio of 90:10 to produce a cathode active material. The cathode active material, carbon black, and PVDF [poly(vinylidene fluoride)] which is a binder were mixed in a weight ratio of 85:10:5 and were further mixed with an organic solvent, NMP (N-Methyl-2-pyrrolidone), to prepare a slurry. Both surfaces of an aluminum foil having a thickness of 20 μm were coated with the slurry and dried to produce a cathode.

A Li secondary battery cell was produced with the cathode, anode, and electrolyte, and then the properties of the secondary battery were evaluated. The capacity of the battery produced with the anode, electrolyte, and cathode was measured using a charging operation voltage of 4.3V and a discharging operation voltage of 3.4V. In order to evaluate the high temperature lifespan, a charging & discharging test of 500 cycles was conducted with a charge/discharge rate of 0.2 C at high temperature of 50° C. and the discharging capacity retention was calculated. Here, the discharging capacity retention was the arithmetic mean of the values obtained by testing 5 samples.

The properties of the electrolytic copper foils of Examples 1-4 and Comparative Examples 1-4 are shown in the following Table 2. Further, the discharging capacity retentions of the Li secondary battery cells including the corresponding electrolytic copper foils as the current collectors thereof are also shown.

TABLE 2

|  | second surface OT (nm) | OTD (nm) | Breaking strength (kgf/mm$^2$) | Discharging capacity retention (%) | Folded or Not |
|---|---|---|---|---|---|
| Ex. 1 | 1.6 | 5.7 | 45.2 | 92 | Good |
| Ex. 2 | 7.8 | 1.4 | 45.7 | 90 | Good |
| Ex. 3 | 4.4 | 2.5 | 25.3 | 91 | Good |
| Ex. 4 | 4.7 | 2.8 | 56.2 | 93 | Good |
| Comp. Ex. 1 | 1.3 | 6.5 | 45.2 | 83 | Folded |
| Comp. Ex. 2 | 8.1 | 6.1 | 45.7 | 87 | Folded |
| Comp. Ex. 3 | 4.5 | 5.9 | 24.1 | 76 | Folded |
| Comp. Ex. 4 | 4.7 | 5.9 | 58.3 | 72 | Folded |

Referring to Tables 1 and 2, the comparison of the Example 1 and Comparative Example 1 of the same conditions other than the dissolved oxygen content shows that OT of Example 1 is higher than that of Comparative Example 1. This means that the electrolytic copper foil of Example 1 can provide more oxygen active sites at the surface than that of Comparative Example 1. Further, Example 1 showed the discharging capacity retention of not less than 90% while that of Comparative Example 1 was less than 90%. Such a low discharging capacity retention of Comparative Example 1 resulted from the fact that the active material could not adhere to the surface of the copper foil sufficiently strongly and thus the charging efficiency decreased rapidly during the charging & discharging test. The comparison of the Example 2 and Comparative Example 2 in both of which higher dissolved oxygen content condition was applied shows that OT of Example 2 of relatively low dissolved oxygen content (11.7 ppm) is lower than that of Comparative Example 1 of relatively high dissolved oxygen content (12.5 ppm). Further, it is shown that the battery produced with the current collector of Example 2 has a higher discharging capacity retention than the battery produced with the current collector of Comparative Example 2. Thus, it can be found that the excessive OT level increases the surface resistance of the copper foil, which in turn decreases the discharging capacity retention.

Figure 4:
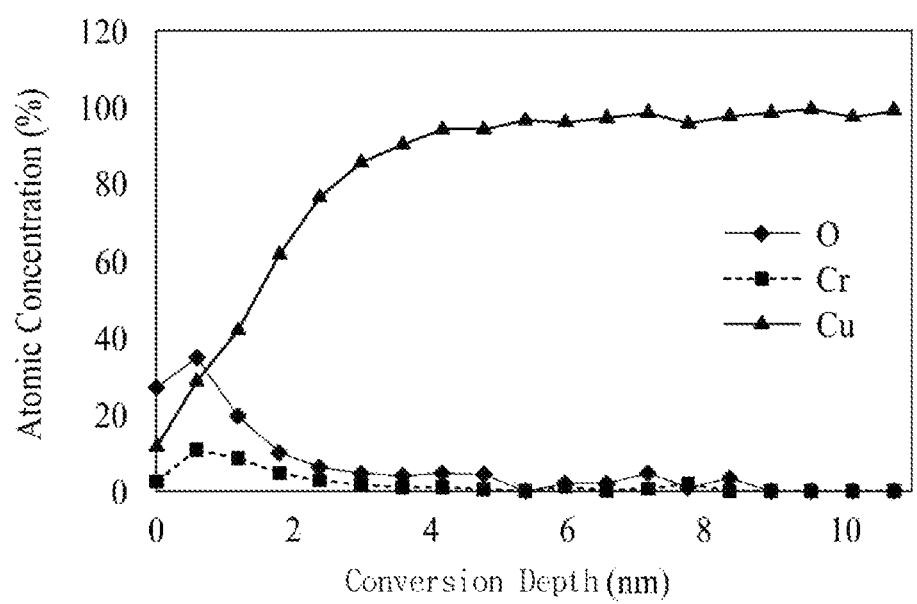
FIG. 4 is a graph showing a concentration profile of each component obtained by measuring the second surfaces of the electrolytic copper foils of Example 1 with AES device.
Figure 5:
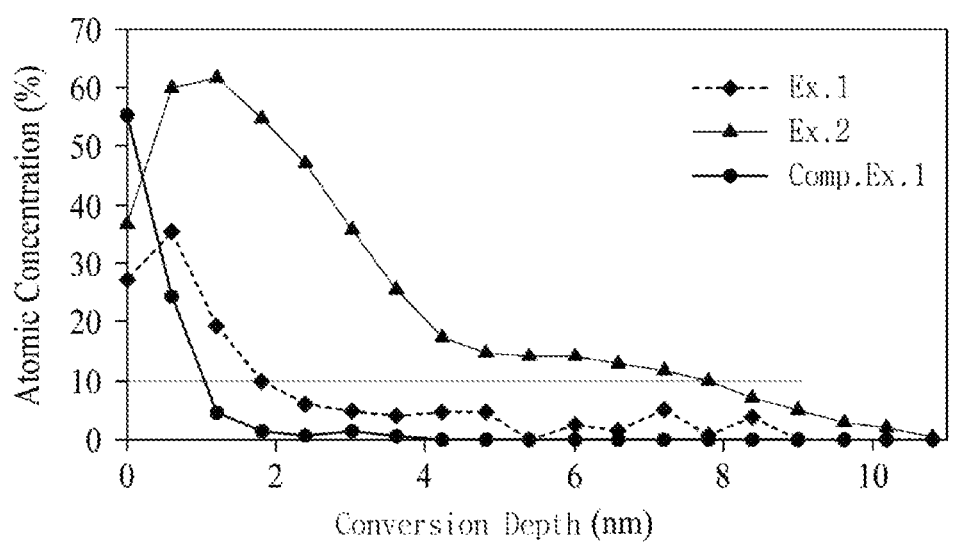
FIG. 5 is a graph showing the oxygen concentration profiles obtained by measuring the second surfaces of the electrolytic copper foils of Example 1, Example 2, and Comparative Example 1 with AES device.

FIG. 4 is a graph showing a concentration profile of each component obtained by measuring the second surface of the electrolytic copper foil of Example 1 with AES device, and FIG. 5 is a graph showing the oxygen concentration profiles obtained by measuring the second surfaces of the electrolytic copper foils of Examples 1 & 2 and Comparative Example 1.

Referring to FIG. 5, it is found that the oxygen concentration of Comparative Example 1 rapidly decreases from the surface and becomes less than 10 atomic % at the conversion depth of about 1.3 nm. On the other hand, the oxygen concentrations of Examples 1 & 2 tend to slightly increase and then decrease between the surface and OT, and the decrease slope of the oxygen concentration in the decrease section tends to be gradual. As explained above with respect to the Examples and Comparative Examples, in the present invention, the OT range is preferably 1.5-8.0 nm.

Referring back to Tables 1 and 2, the property data of the Example 3 and Comparative Example 3 in both of which the same dissolved oxygen content condition was applied shows that the slightly more TIC content of the Comparative Example 3 made the breaking strength less than 25 kgf/mm$^2$. Further, since such insufficient strength of the copper foil itself causes a disconnection when a Si-mixed active material is applied, a sharp drop of the charging efficiency occurred in the Comparative Example 3 when the charging & discharging test was conducted.

The Example 4 and Comparative Example 4 to which different Fe concentration conditions were applied show that the Fe ion concentration lower than 0.3 g/L as applied in the Comparative Example 4 leads to a breaking strength higher than 57 kgf/mm$^2$, which in turn remarkably decreases the stretch property of the copper foil. Thus, when the charging & discharging evaluation is conducted, the copper foil cannot endure its volume expansion and may cause a disconnection of the electrode so that the charging efficiency rapidly decreases.

The Examples 1 to 4 show relatively low OTD while the Comparative Examples 1 to 4 show high OTD of not lower than 5.9 nm. As a result, the folding was observed in all of the Comparative Examples. Such a high OTD may cause an electrode plate produced by coating an anode material onto both surfaces of the copper foil and drying the same to be bent by making the adhesion of the copper foil to the active material at both surfaces thereof different, and may be a main cause of the folding of the copper foil during a roll-to-roll process to produce a Li secondary battery.

Although the present invention has been described above in detail using some embodiments of the present invention, the aforementioned embodiments are given by way of illustration of the technical aspects of the present invention only, and those skilled in the art will appreciate that various changes and modifications are possible without departing from the essential features of the invention. Accordingly, the embodiments of the present disclosure are not for limiting the technical aspects of the present invention but for explaining them, and the scope of the invention should not be limited by such embodiments. The protection scope of the present invention should be interpreted based on the accompanying claims, and all the equivalents to the claimed inventions should be interpreted as being within the scope of the present invention.

The invention claimed is:

1. An anode for a Lithium (Li) secondary battery, the anode comprising:
    a current collector including an electrolytic copper foil having a first surface and a second surface opposite to the first surface; and
    an anode active material layer on the second surface, wherein the electrolytic copper foil comprises:
        a first protective layer forming the first surface;
        a second protective layer forming the second surface, the second protective layer being in contact with the anode active material layer at the second surface; and
        a copper film between the first and second protective layers,
    wherein an oxygen-containing part at the second surface has a thickness (OT) of not less than 1.5 nanometers (nm) and less than 8.0 nm,
    the thickness of the oxygen-containing part at the second surface is a Silicon Dioxide (SiO$_2$) conversion thickness of a portion of the second protective layer, the electrolytic copper foil is heat treated at 110° C. for 10 minutes to have a breaking strength of 25 to 57 kilograms of force per square millimeter (kgf/mm$^2$), and the portion of the second protective layer is a portion showing a concentration of oxygen component of not less than 10 atom % when measured with Auger Electron Spectroscopy (AES) from the second surface, wherein the concentration of the oxygen component measured from the second surface increases from the second surface to a first depth from the second surface.

2. The anode according to claim 1, wherein the first protective layer and the second protective layer comprise a chromate.

3. The anode according to claim 1, wherein the concentration of the oxygen component decreases from the first depth to a second depth, greater than the first depth, from the second surface.

4. The anode according to claim 1, wherein a difference between a thickness of an oxygen-containing part at the first surface and the thickness of the oxygen-containing part at the second surface is not more than 5.8 nm.

5. The anode according to claim 1, wherein the anode active material is a metal selected from the group consisting of:

Germanium (Ge);
Tin (Sn);
Lithium (Li);
Zinc (Zn);
Magnesium (Mg);
Cadmium (Cd);
Cesium (Ce);
Nickel (Ni); and
Iron (Fe).

6. The anode according to claim 1, wherein the anode active material is a carbon based-compound.

7. The anode according to claim 1, wherein the anode active material is a composite material of carbon and a metal.

8. The anode according to claim 1, wherein the breaking strength of the electrolytic copper foil is controlled by an amount of total inorganic carbon (TIC) and an amount of iron (Fe) included in the electrolytic copper foil.

9. The anode according to claim 8, wherein the amount of the TIC is not more than 0.05 grams per liter (g/L) and the amount of Fe is not more than 0.4 g/L.

10. The anode according to claim 1, wherein the first depth is between 0.5 and 1.5 nm from the second surface.

11. The anode according to claim 3, wherein the second depth is at least 4 nm from the second surface.

12. The anode according to claim 3, wherein the second depth is at least 6 nm from the second surface.

13. The anode according to claim 1, wherein the concentration of the oxygen component measured from the second surface gradually increases from the second surface to the first depth from the second surface.

* * * * *